United States Patent
Chen et al.

(10) Patent No.: US 12,138,735 B2
(45) Date of Patent: Nov. 12, 2024

(54) MULTI-LAYERED WINDOWS FOR USE IN CHEMICAL-MECHANICAL PLANARIZATION SYSTEMS

(71) Applicant: Taiwan Semiconductor Manufacturing Co., Ltd., Hsinchu (TW)

(72) Inventors: Shih-Chung Chen, Hsinchu (TW); Yi-Shao Lin, Hsinchu (TW); Sheng-Tai Peng, Miaoli County (TW); Ya-Jen Sheuh, Hsinchu (TW); Hung-Lin Chen, Pingtung (TW); Ren-Dou Lee, Hsinchu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 623 days.

(21) Appl. No.: 16/559,472

(22) Filed: Sep. 3, 2019

(65) Prior Publication Data
US 2020/0164482 A1 May 28, 2020

Related U.S. Application Data

(60) Provisional application No. 62/772,603, filed on Nov. 28, 2018.

(51) Int. Cl.
*B24B 37/20* (2012.01)
*B24B 37/013* (2012.01)
*B24B 37/04* (2012.01)
*C09G 1/02* (2006.01)

(52) U.S. Cl.
CPC .......... *B24B 37/205* (2013.01); *B24B 37/013* (2013.01); *B24B 37/044* (2013.01); *C09G 1/02* (2013.01)

(58) Field of Classification Search
CPC ............... B24B 37/205; B24B 37/013; B24B 37/20–26; C09G 1/02; C09G 1/08–10
USPC ........................... 451/6, 11, 287, 526
See application file for complete search history.

(56) References Cited

U.S. PATENT DOCUMENTS

| | | | |
|---|---|---|---|
| 5,433,651 A * | 7/1995 | Lustig ................ | G01B 11/0683 451/6 |
| 6,280,290 B1 | 8/2001 | Birang et al. | |
| 6,537,133 B1 | 3/2003 | Birang et al. | |
| 7,264,536 B2 * | 9/2007 | Wiswesser ............ | B24B 49/12 451/6 |

(Continued)

FOREIGN PATENT DOCUMENTS

JP 2008221367 A * 9/2008

OTHER PUBLICATIONS https://www.drugs.com/cdi/polyethylene-glycol-propylene-glycol-spray.html#:~:text=Polyethylene%20glycol%2F%20propylene%20glycol%20spray%20is%20used%20for%3A,as%20determined%20by%20your%20doctor, Jun. 3, 2015 (Year: 2015).*

(Continued)

*Primary Examiner* — Robert F Neibaur
(74) *Attorney, Agent, or Firm* — Seed IP Law Group LLP

(57) ABSTRACT

Described herein are multi-layered windows for use in chemical-mechanical planarization (CMP) systems and CMP processes. The multi-layered windows of the present disclosure include a transparent structural layer and a hydrophilic surfactant applied to at least a portion of at least one surface of the transparent structural layer. Such multi-layered windows may be in the polishing pad, the platen, or both.

20 Claims, 5 Drawing Sheets

(56) References Cited

U.S. PATENT DOCUMENTS

| | | | | |
|---|---|---|---|---|
| 9,017,140 B2* | 4/2015 | Allison | ............... | B24B 37/205 |
| | | | | 451/526 |
| 9,228,114 B2* | 1/2016 | Cheng | ..................... | C09G 1/02 |
| 2003/0129931 A1* | 7/2003 | Konno | ................ | B24B 37/205 |
| | | | | 451/285 |

OTHER PUBLICATIONS https://www.hindawi.com/journals/ijps/2016/8458752/, Tang et al, bottom up fabricaction of PEG brush on poly(dimethylsiloxane) for antifouling surface construction, May 5, 2016 (Year: 2016).*
Machine translation of JP-2008221367-A (Year: 2008).*

* cited by examiner

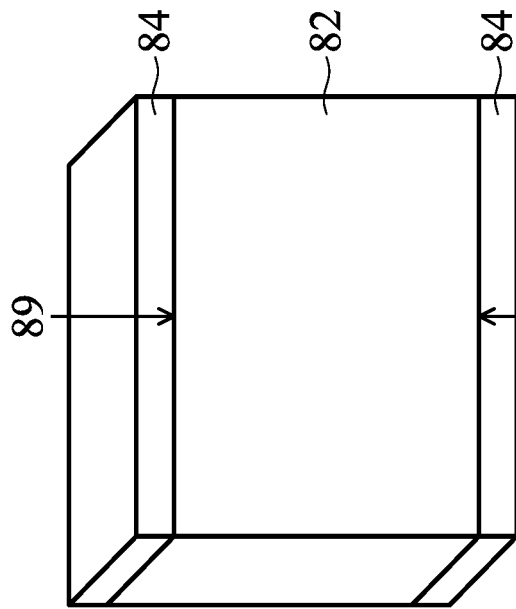
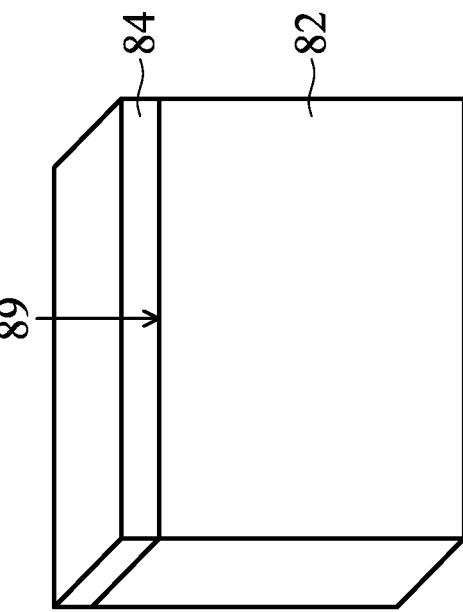
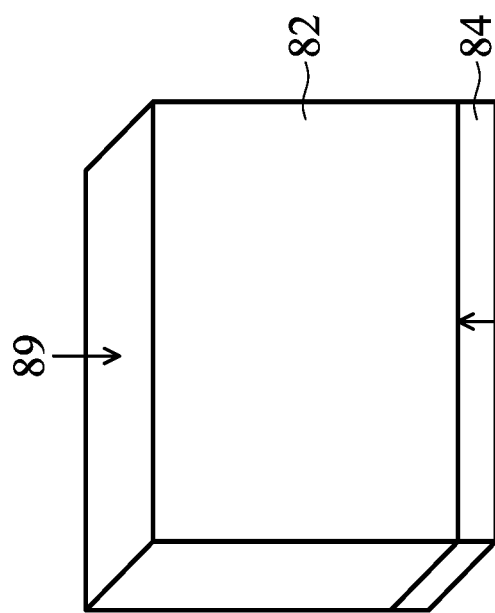
FIG. 3A
FIG. 3B
FIG. 3C

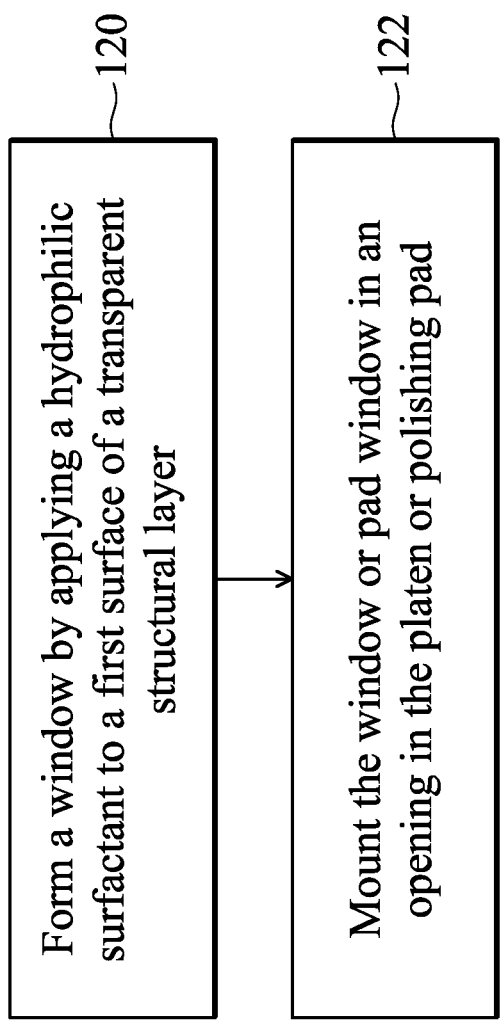

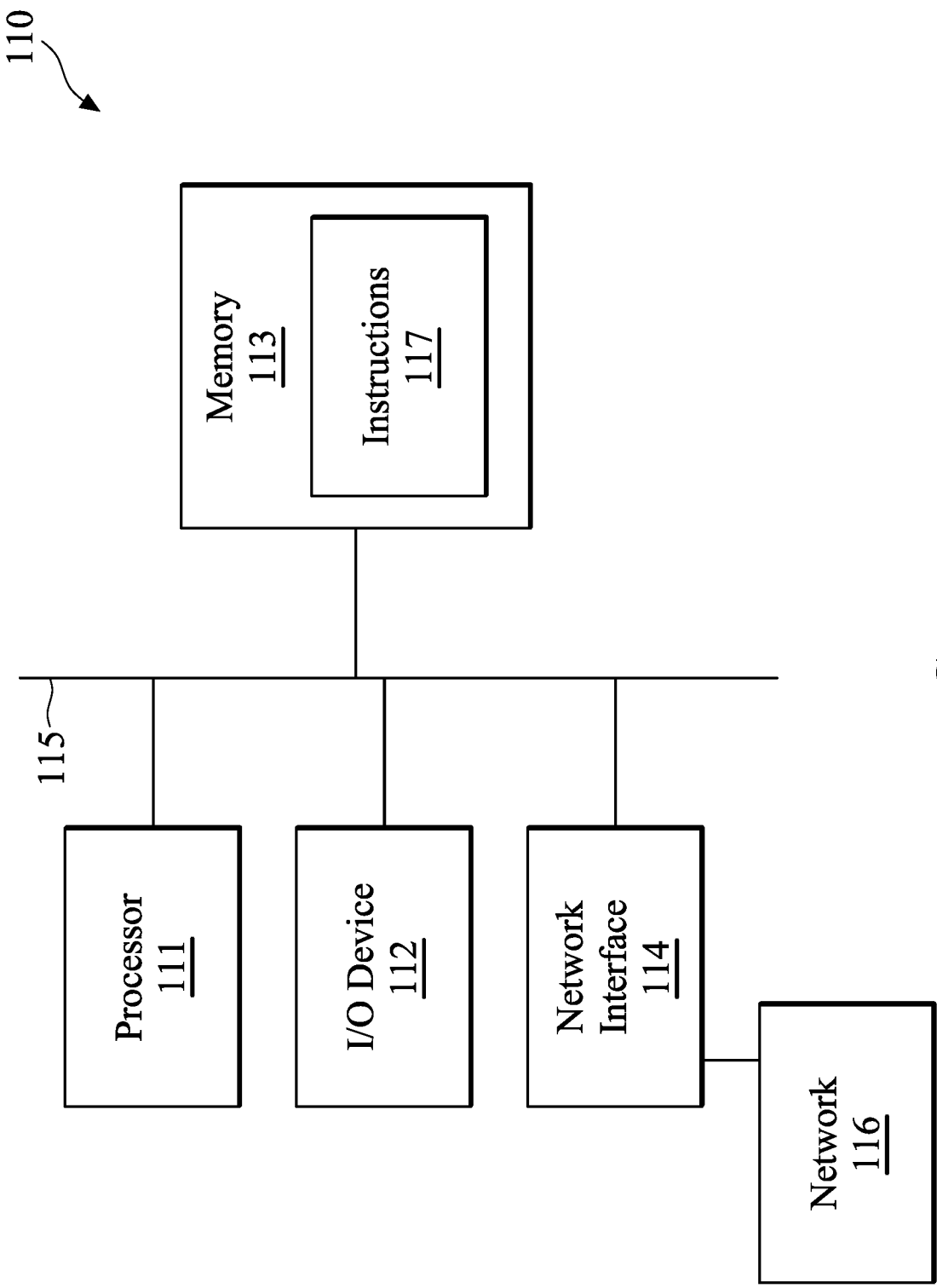

MULTI-LAYERED WINDOWS FOR USE IN CHEMICAL-MECHANICAL PLANARIZATION SYSTEMS

PRIORITY CLAIM AND CROSS-REFERENCE

This application claims the benefit of U.S. Provisional Patent Application No. 62/772,603, filed Nov. 28, 2018, which is incorporated by reference herein.

BACKGROUND

Chemical Mechanical Polishing (CMP) is a common practice in the formation of integrated circuits. Typically, CMP is used for the planarization of semiconductor wafers. CMP takes advantage of the combined effect of both physical and chemical forces for the polishing of wafers. It is performed by applying a load force to the back of a wafer while the wafer rests on a polishing pad. The polishing pad and the wafer are then counter-rotated while a slurry containing abrasives and/or reactive chemicals is passed therebetween. CMP is an effective way to achieve global planarization of wafers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3C are diagrams of multi-layer windows in accordance with some embodiments.

FIG. 4 is a flowchart of a method of forming a window or pad window of the present disclosure in accordance with some embodiments.

FIG. 5 is a diagram of a control system for controlling operation of a CMP system, in accordance with some embodiments.

DETAILED DESCRIPTION

Figure 1:
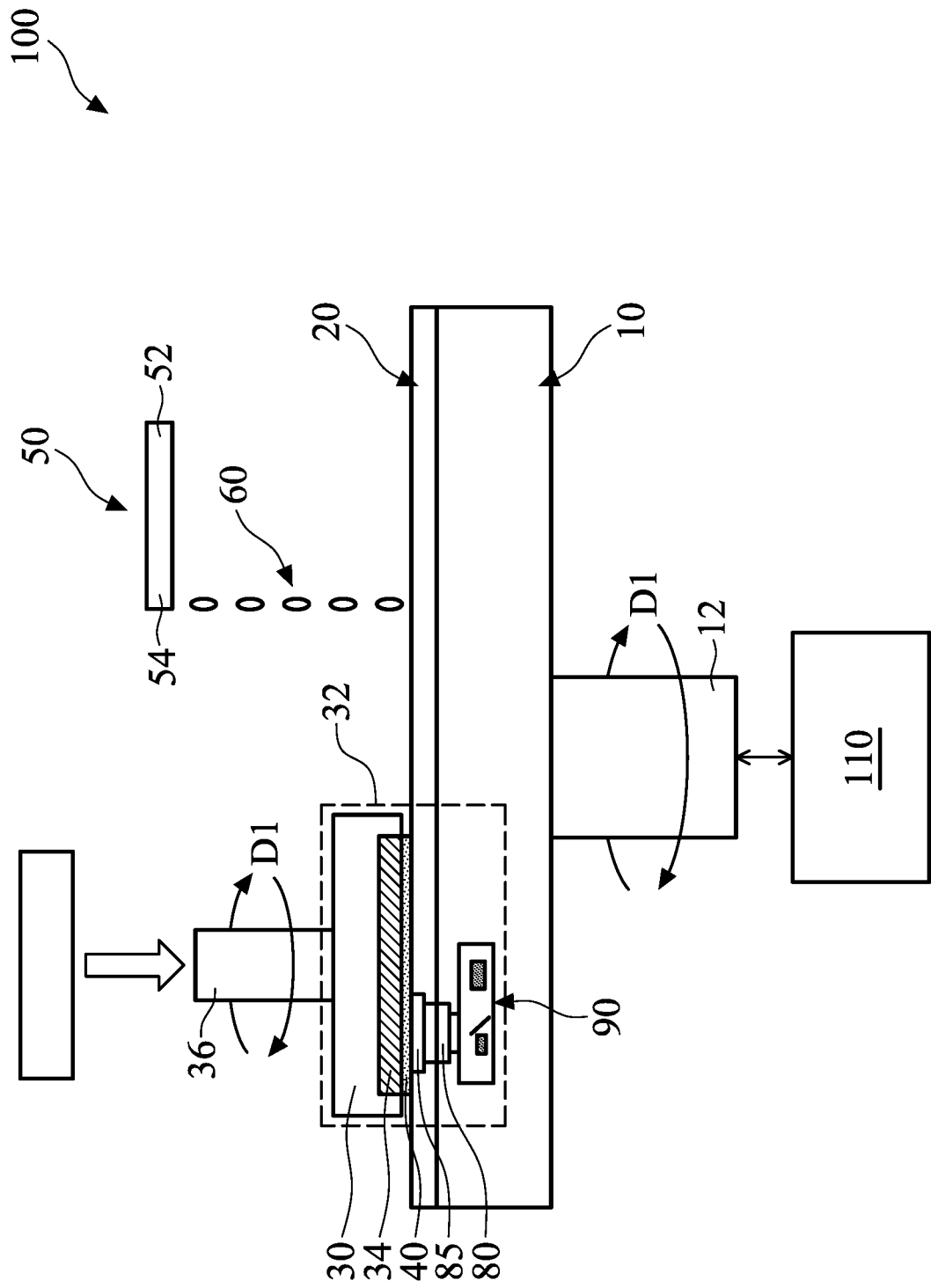
FIG. 1 is a diagram of a chemical mechanical polishing (CMP) system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Described herein are multi-layered windows for use in chemical-mechanical planarization (CMP) systems and CMP processes. The multi-layered windows of the present disclosure improve endpoint detection by reducing laser scatter caused by uneven moisture (e.g., droplets) on windows through which the laser beam passes. Such multi-layered windows may be in the polishing pad, the platen, or both.

Embodiments of the present disclosure also include using the described CMP systems in accordance with various embodiments in the process of manufacturing integrated circuits. For example, methods include using the CMP systems described herein to planarize wafers, on or in which integrated circuits are formed.

FIG. 1 schematically illustrates a perspective view of a CMP system 100. The CMP system 100 includes a platen 10, a polishing pad 20 on top of the platen 10, and a wafer carrier 30 configured to support a wafer 40 for processing using the CMP system 100. The CMP system 100 further includes a slurry delivery system 50 configured to deliver a slurry 60 to the polishing pad 20 to facilitate removal of metals or non-metal features from the wafer 40. A control system 110 is configured to control operation of the CMP system 100. The CMP system 100 further includes a dressing disk (not shown) configured to restore a roughness of polishing pad 20.

During the CMP process, the platen 10, which is rotated by a mechanism, such as a motor (not shown) rotates in a direction. The platen 10 is configured to rotate in at least a first direction (e.g., in direction D1). In some embodiments, the platen 10 is configured to rotate in more than one direction. In some embodiments, the platen 10 is configured to have a constant rotational speed. In some embodiments, the platen 10 is configured to have a variable rotational speed. In some embodiments, the platen 10 is rotated by a motor through a platen spindle 12. In some embodiments, the motor is an alternating current (AC) motor, a direct current (DC) motor, a universal motor, or another suitable motor. In other embodiments, the platen 10 is configured to be held stationary.

The platen 10 and the platen spindle 12 are each made of a material having good chemical resistance to the slurry 60. In some embodiments, the platen 10 and the platen spindle 12 are each made of stainless steel or polyetheretherketone (PEEK).

In some embodiments, the platen 10 is configured to translate in one or more directions such that it can apply pressure on the surface of the wafer 40 during the CMP process. In other embodiments, the wafer carrier 30 may push a wafer 40 in a direction against the polishing pad 20, such that the surface of the wafer 40 in contact with the polishing pad 20 may be polished by the slurry 60.

As the platen 10 rotates, the polishing pad is rotated. The platen 10, polishing pad 20, or both are configured such that the polishing pad 20 rotates in a same direction at a same speed as the platen 10. In embodiments, the polishing pad 20 is removably coupled (e.g., via an adhesive) to the platen 10.

In some embodiments where platen 10 is stationary, the polishing pad 20 is held stationary.

The polishing pad 20 has a textured surface which is configured to remove material from the wafer 40 during operation of CMP system 100. The polishing pad 20 is formed of a material that is hard enough to allow abrasive particles in the slurry to mechanically polish wafer 40, which is between the wafer carrier 30 and the polishing pad 20. On the other hand, polishing pad 20 is soft enough so that it does not substantially scratch surfaces of the wafer 40 it comes in contact with during the polishing process. Further, the polishing pad 20 is made of a material having good chemical resistance to the slurry 60. In some embodiments, the polishing pad 20 is made of polyurethane.

During operation of the CMP system 100, the wafer carrier 30 is configured to hold a wafer 40 proximate to the polishing pad 20. In some embodiments, the wafer carrier 30 includes a retaining ring 32. A carrier film 34 inside of the retaining ring 32 attaches the wafer 40 to the wafer carrier 30.

For further planarization of the wafer 40, the wafer carrier 30 may rotate (e.g., in the direction D1, as shown, or the reverse direction), causing the wafer 40 to rotate, and move on the polishing pad 20 at the same time, but various embodiments of the present disclosure are not limited in this regard. In other words, the wafer carrier 30 is configured to rotate in a second direction. In some embodiments, the second direction is the same as the first direction. In other words, wafer carrier 30 and polishing pad 20 rotate in the same direction (e.g., clockwise or counter-clockwise). In some embodiments, the second direction is opposite the first direction. In other words, wafer carrier 30 and polishing pad 20 rotate in opposite directions. In some embodiments, the wafer carrier 30 is configured to rotate at a constant rotational speed. In some embodiments, the wafer carrier 30 is configured to rotate at a variable rotational speed. In some embodiments, the wafer carrier 30 is rotated by a motor through a wafer carrier spindle 36. In some embodiments, the motor is an AC motor, a DC motor, a universal motor, or another suitable motor. In other embodiments, the wafer carrier 30 is held stationary. In some embodiments, the wafer carrier 30 translates relative to polishing pad 20. The wafer carrier 30, the carrier film 34 and the wafer carrier spindle 36 are each made of a material having good chemical resistance to the slurry 60. In some embodiments, the wafer carrier 30 and the wafer carrier spindle 36 are each made of stainless steel or PEEK, and the carrier film 34 is made of polyurethane.

While the CMP system 100 is in operation, slurry 60 flows between wafer 40 and polishing pad 20. The slurry 60 includes reactive chemical(s) that react with the surface layer of the wafer 40, and abrasive particles for mechanically polishing the surface of the wafer 40. Through the chemical reaction between the reactive chemical(s) in the slurry 60 and the surface layer of wafer 40, and the mechanical polishing, the surface layer of wafer 40 is removed.

Slurry 60 generally includes abrasive particles in an aqueous solution. In some embodiments, the slurry 60 further includes one or more chemical additives, such as an oxidizing agent, a chelating agent, a corrosion inhibitor, or a pH adjusting agent. The chemical additives help to provide proper modification of metal surfaces to be polished, which helps to improve polishing efficiency.

The abrasive particles mechanically polish the surface of the wafer 40. Examples of abrasive particles include silica ($SiO_2$), alumina ($Al_2O_3$), ceria ($CeO_2$), titania ($TiO_2$), zirconia ($ZrO_2$), magnesia (MgO), and manganese oxide ($MnO_2$). In some embodiments, the slurry 60 includes a single type of abrasive particles. In some embodiments, the slurry 60 includes a mixture of two or more types of abrasive particles. For example, in some embodiments, the slurry 60 includes some abrasive particles that are $CeO_2$, and some abrasive particles that are $SiO_2$ or $Al_2O_3$. In some embodiments, to help to obtain good dispersion stability and to minimize the occurrence of scratches, the slurry 60 includes colloidal $SiO_2$, colloidal $Al_2O_3$, colloidal $CeO_2$, or combinations thereof.

To help to obtain a favorable polishing rate, the abrasive particles have an average particle size (e.g., average particle diameter) of about 20 nanometer (nm) to about 500 nm. If the size of the abrasive particles is too small, the polishing rate becomes too low for the CMP process to be effective. If the size of the abrasive particles is too great, the chance of generating defects on the wafer 40 surface due to scratching is increased. In some embodiments, the slurry 60 includes abrasive particles of similar sizes. In some implementations, the slurry 60 includes a mixture of abrasive particles of different sizes. For example, in some embodiments, the slurry 60 includes some abrasive particles that have sizes clustered around a smaller value, e.g., less than about 50 nm, and other abrasive particles that have sizes clustered around a larger value, e.g., about 100 nm or more.

The slurry 60 includes any suitable amount of abrasive particles. In some embodiments, the slurry 60 includes about 10 wt. % or less of abrasive particles. In some embodiments, the slurry 60 includes about 0.01 wt. % to about 10 wt. % of abrasive particles. The higher wt. % of the abrasive particles in the slurry 60 normally provides a greater polishing rate. However, if the concentration of the abrasive particles is too high, abrasive particles agglomerate into large particles that fall out of the solution, rendering the slurry unsuitable for polishing. Thus, the concentration of abrasive particles in the polishing slurry 60 is set to be as high as practical without causing agglomeration of abrasive particles.

Optionally, an oxidizing agent is incorporated into the slurry 60 to facilitate efficient removal and better planarization. The oxidizing agent promotes oxidation of metals in a barrier layer and a conductive material layer to corresponding metal oxides, and the metal oxides are subsequently removed by mechanical grinding. For example, an oxidizing agent is used to oxidize tungsten to tungsten oxide; thereafter, the tungsten oxide is mechanically polished and removed. As a further example, the oxidizing agent is able to oxidize copper to cuprous oxide or cupric oxide; thereafter, the cuprous oxide or cupric oxide is mechanically polished and removed. Examples of oxidizing agents include hydrogen peroxide, peroxosulfates, nitric acid, potassium periodate, hypochlorous acid, ozone, ferric nitrate ($Fe(NO_3)_3$), potassium nitrate $K(NO_3)$, and combinations thereof. The slurry 60 includes any suitable amount of oxidizing agent, if present, to ensure rapid oxidation of metal layers while balancing the CMP performance.

Optionally, a chelating agent is incorporated into the slurry 60 to improve the planarization or polishing of metal surfaces. The chelating agent is capable of forming a complex compound with metal ions, e.g., Cu or W ions, so that oxidized metal is able to be removed from the metal surfaces being polished. Examples of chelating agent include, for example, inorganic acids such as phosphoric acid, organic acids such as acetic acid, oxalic acid, malonic acid, tartaric acid, citric acid, maleic acid, phthalic acid, or succinic acid, and amines such as ethanol amine or propanol amine.

Optionally, a corrosion inhibitor is incorporated into the slurry 60 to help prevent corrosion of metals during the CMP processes. In some embodiments, the corrosion inhibitor includes a material that is the same as the chelating agent. The slurry includes any suitable amount of a corrosion inhibitor, if present. In some embodiments, the slurry 60 includes 10 wt. % or less of corrosion inhibitor. In some embodiments, the slurry 60 includes about 0.01 wt. % to about 10 wt. % of corrosion inhibitor.

Optionally, a pH adjusting agent is incorporated in the slurry 60 to maintain a pH level of the slurry in a range from about 2 to about 11. The pH of the slurry 60 varies depending upon the metals present at the surface to be polished. For example, the pH of the slurry 60 is generally from about 2 to 7 for polishing tungsten and aluminum, while the pH of the slurry is set to be from about 7 to 11 for polishing copper, cobalt, and ruthenium. In some embodiments, acids such as hydrochloric acid, nitric acid, sulfuric acid, acetic acid, tartaric acid, succinic acid, citric acid, malic acid, malonic acid, various fatty acids, and various polycarboxylic acids are employed to lower the pH of the slurry.

As is understood by one of skill in the art, certain aforementioned compounds are capable of performing more than one function. For example, some compounds, such as organic acids are capable of functioning as an oxidizing agent, a chelating agent, as well as a pH adjusting agent.

The slurry dispenser 50, which has an outlet 54 over the polishing pad 20, is used to dispense slurry 60 onto the polishing pad 20. The slurry delivery system 50 further includes a slurry arm 52 configured to translate a location of outlet 54 relative to the surface of the polishing pad 20. The slurry arm 52 is made of a material having good chemical resistance to the slurry 60. In some embodiments, the slurry arm 52 is made of stainless steel or polyurethane.

A drain cup (not shown) may be disposed around a perimeter of platen 10. The drain cup is capable of collecting excess slurry 60 that is dispensed onto the polishing pad 20 during CMP processes.

In summary, when the CMP system 100 is in operation, the slurry arm 52 dispenses the slurry 60 onto the polishing surface of the polishing pad 20. A motor, under control of the control system 110, rotates the platen 10 and the polishing pad 20 via platen spindle 12 about a polishing pad axis, as shown by arrows D1. Another motor, also under control of the control system 110, rotates a wafer 40 housed within the wafer carrier 30 about a wafer axis via a wafer carrier spindle 36, as shown by arrows D1. While this dual-rotation occurs, the wafer 40 is "pressed" into the slurry 60 and the polishing surface of the polishing pad 20 with a down force applied to the wafer carrier 30. The combined mechanical force and chemical interactions polishes the surface of the wafer 40 until an endpoint for the CMP operation is reached.

In order to end the polishing portion of the CMP process at the end point, the CMP system 100 includes an endpoint detector 90, which is arranged in the platen 10 under a window 80. Similarly, polishing pad 20 includes a pad window 85 arranged over the window 80 of the platen 10.

In various embodiments, window 80, pad window 85, or both, are circular. In other embodiments, window 80, pad window 85, or both, are rectangular. In other embodiments, window 80, pad window 85, or both, are arc-shaped. Window 80 and pad window 85 can be formed in any suitable manner, for example, as an insert mounted within an opening. In such embodiments, an opening 86, 88 is formed in the platen 10 or polishing pad 20, and the window 80 or pad window 85 is mounted in the opening 86, 88.

In various embodiments, a top surface of the window 80 is substantially co-planar with the top surface of the platen 10. In other embodiments, a top surface of the window 80 protrudes above the top surface of the platen 10. In still other embodiments, a top surface of the window 80 is recessed below the top surface of the platen 10.

In various embodiments, a top surface of the pad window 85 is substantially co-planar with the polishing surface of the polishing pad 20. In other embodiments, a top surface of the pad window 85 is recessed below the polishing surface of the polishing pad 20.

The CMP system 100 of the disclosure may further comprise a positioning sensor (not shown) to sense when the window 80 is adjacent to the wafer 40. The CMP system 100, including the endpoint detector 90, a positioning sensor, etc., are under control of the control system 110, as described further below with regard to FIG. 5.

Figure 2:
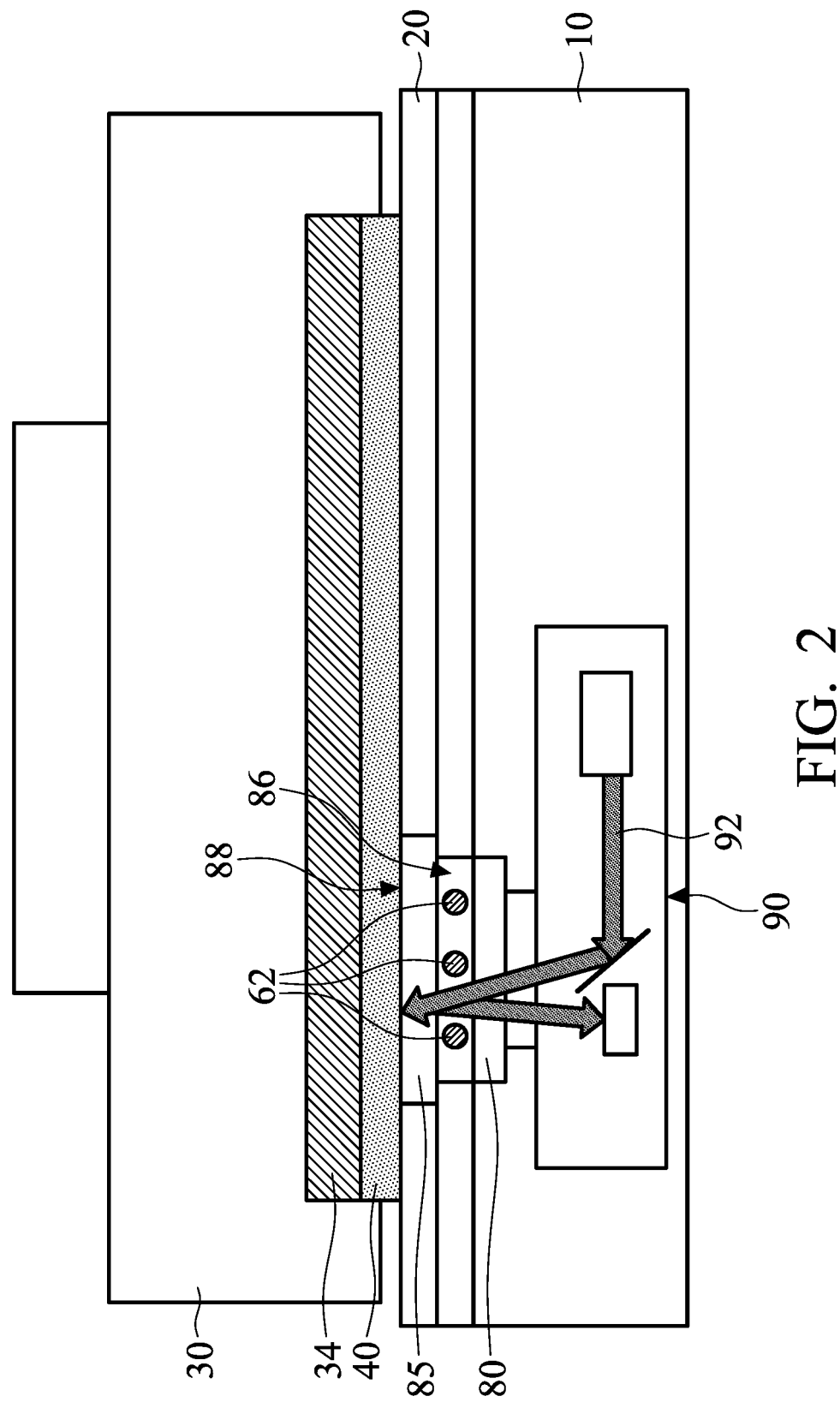
FIG. 2 is a diagram of a portion of a CMP system in accordance with some embodiments.

As shown in FIG. 2, which is an enlarged view of the area enclosed by a dashed rectangle in FIG. 1, the endpoint detector 90 includes a laser interferometer capable of generating a laser beam 92, which is directed towards the wafer 40, and detecting light reflected back to the end point detector 90. The window 80 provides a pathway for the laser beam to impinge on the wafer 40, at least while the wafer 40 overlies the window 80 during the polishing process.

Window 80, pad window 85, or both are multi-layered windows that comprise a transparent structural layer 82 on which a hydrophilic surfactant 84 has been applied, as illustrated in FIGS. 3A-3C. The hydrophilic surfactant 84 may be applied to one or both surfaces of the transparent structural layer using any suitable techniques. In various embodiments, the hydrophilic surfactant 84 is applied to one surface 87 of the transparent structural layer 82, as shown in FIG. 3A. In other embodiments, the hydrophilic surfactant 84 is applied to one surface 89 of the transparent structural layer 82, as shown in FIG. 3B. In further embodiments, the hydrophilic surfactant 84 is applied to both surface 87 and surface 89 of the transparent structural layer 82, as shown in FIG. 3C. However, as is understood, in various embodiments, the hydrophilic surfactant 84 can be applied to one or both of surface 87 and surface 89 of the transparent structural layer 82 of the window 80, the pad window 85, or both.

In some embodiments, the hydrophilic surfactant 84 is applied to at least a portion of at least one surface of the transparent structural layer 82, the portion including the location through which the laser beam travels. In some embodiments, the hydrophilic surfactant 84 is applied around an outer edge of at least one surface of the transparent structural layer 82. In some embodiments, the hydrophilic surfactant 84 is applied in a central area of at least one surface of the transparent structural layer 82. In some embodiments, the hydrophilic surfactant 84 is applied to at least a majority of at least one surface of the transparent structural layer 82. In still further embodiments, the hydrophilic surfactant 84 is applied to at least one entire surface of the transparent structural layer 82. In some embodiments, the hydrophilic surfactant 84 is applied to both surfaces of the transparent structural layer 82. In a specific embodiment, the hydrophilic surfactant 84 is not applied on one surface of the transparent structural layer 82 of the pad window 85. In another specific embodiment, a top surface of the pad window 85 is recessed below the polishing surface of the polishing pad 20, and the hydrophilic surfactant 84 is applied to the top surface of the transparent structural layer 82.

The transparent structural 82 layer is made of a suitable material having good chemical resistance to the slurry 60 and that provides for sufficient transmission of the laser beam. Additionally, a suitable material for use as the transparent structural layer 82 is sufficiently abrasion resistant, such that incidental contact would not mar the surface and impair the transmission of the laser beam, has a high load bearing capacity, and is resistant to water, so as to minimize the amount of liquid that can reach the end point detector. For example, the transparent structural layer 82 may be formed of polyurethane. As is understood, the polyurethane can be functionalized to the extent the functional groups do not interfere with the described properties. In various embodiments, the polyurethane is hydrophobic. In particular embodiments, the polyurethane is a thermosetting polyurethane.

The transparent structural layer 82 can have any suitable thickness such that the combined thickness of the transparent structural layer 82 and the hydrophilic surfactant 84 is compatible with standard CMP components (e.g., platens, polishing pads, etc.). In embodiments, the transparent structural layer 82 has a thickness ranging from about 50 micrometers (μm) to about 2,200 μm.

The hydrophilic surfactant 84 can be any suitable surfactant that has sufficient hydrophilicity to create a substantially uniform layer of water on the surface when contacted with a CMP slurry. In embodiments, the substantially uniform layer of water is atomically thin (e.g., a monolayer, a bilayer, a trilayer, etc.).

In embodiments, the hydrophilic surfactant comprises a hydrophilic polymer. In various embodiments, the hydrophilic surfactant 84 comprises a polyethylene chain, —COOH functional group, a hydroxyl functional group, or a combination thereof. In various embodiments, the hydrophilic surfactant is a hydroxyl compound (R—OH). In some embodiments, the hydrophilic surfactant comprises a polyoxyethylene chain. In some embodiments, the hydrophilic surfactant comprises a —COOH functional group. In specific embodiments, the hydrophilic surfactant is a polyethylene glycol.

As noted above, the hydrophilic surfactant 84 can have any suitable thickness such that the combined thickness of the transparent structural layer 82 and the hydrophilic surfactant 84 is compatible with standard CMP components (e.g., platens, polishing pads, etc.). Additionally, the hydrophilic surfactant 84 should have sufficient thickness so as to have the desired hydrophilic effect on water that contacts the surface, without impairing the performance of the end point detector. In other words, the hydrophilic surfactant 84 should have sufficient thickness to produce a hydrophilic surface on which water forms a substantially consistent layer rather than forming droplets or beads, without distorting the laser transmittance. In embodiments, the hydrophilic surfactant 84 has a thickness ranging from about 20 μm to about 50 μm.

In some embodiments, such as is illustrated in FIG. 4, a window or pad window of the present disclosure is formed by a method comprising forming a window by applying a hydrophilic surfactant to a first surface of a transparent structural layer (operation 120), and mounting the window or pad window in an opening in the platen or polishing pad (operation 122).

Any suitable method can be used to apply the hydrophilic surfactant 84 to portion(s) of the surface(s) of the transparent structural layer 82. In particular embodiments, the hydrophilic surfactant 84 is brushed onto portion(s) of the surface(s) of the transparent structural layer 82. In other embodiments, the hydrophilic surfactant 84 is sprayed onto portion(s) of the surface(s) of the transparent structural layer 82. In various embodiments, multiple coats of the hydrophilic surfactant 84 are applied. In specific embodiments, at least two coats are applied.

In some embodiments, the hydrophilic surfactant 84 is applied to the transparent structural layer 82 before the window or pad window is installed into the platen or polishing pad, respectively. In other embodiments, the hydrophilic surfactant 84 is applied to the transparent structural layer 82 after the window or pad window is installed into the platen or polishing pad, respectively.

In particular embodiments, a window or pad window of the present disclosure is formed by a method comprising forming a window by applying a hydrophilic surfactant to a first surface of a transparent structural layer, forming an opening in the platen or polishing pad, and mounting the window or pad window in the opening.

Returning briefly to FIG. 2, the endpoint detector 90 is used while the CMP process is underway. As the slurry 60 flows onto polishing pad 20, some moisture 62 from the slurry 60 leaks into the space between the end point detector 90 and the window 80, and/or the space between the window 80 and the pad window 85. If water forms droplets or beads on the window and/or pad window, it may impair performance of the endpoint detector by scattering the laser beam. Advantageously, the multi-layered windows of the present disclosure provide a hydrophilic surface on which water forms a substantially consistent layer on the surface, rather than forming droplets or beads. This results in better transmittance of the laser beam 92 of the endpoint detector 90 as it is reflected toward the wafer 40 through the window 80, and then reflected back to the endpoint detector 90. The improved transmittance provides a more reliable and accurate endpoint determination, which has several benefits. First, the lifetime of the polishing pad is prolonged, because the polishing pad does not continue to polish wafers after the endpoint is reached due to detection errors. Additionally, the efficiency of use of the CMP system is increased, which increases the amount of wafers that can be polished and the overall cost of polishing. Further, the quality and consistency of the wafers polished increases, as the endpoint is more accurately detected.

FIG. 5 is a block diagram of a control system 110 for controlling operation of a CMP system, in accordance with one or more embodiments. The control system 110 generates output control signals for controlling operation of one or more components of CMP system, in accordance with some embodiments. The controller system 110 receives input signals from one or more components of the CMP system, in accordance with some embodiments. In some embodiments, the control system 110 is located adjacent CMP system. In some embodiments, the control system 110 is remote from the CMP system.

The control system 110 includes a processor 111, an input/output (I/O) device/interface 112, a memory 113, and a network interface 114 each communicatively coupled via a bus 115 or other interconnection communication mechanism.

The processor 111 is arranged to execute and/or interpret one or more sets of instructions 117 stored in the memory 113. In some embodiments, the processor 111 is a central processing unit (CPU), a multi-processor, a distributed processing system, an application specific integrated circuit (ASIC), and/or a suitable processing unit.

The I/O interface 112 is coupled to external circuitry. In some embodiments, the I/O interface 112 includes a keyboard, keypad, mouse, trackball, trackpad, and/or cursor direction keys for communicating information and commands to the processor 111.

The memory 113 (also referred to as a computer-readable medium) includes a random access memory or other dynamic storage device, communicatively coupled to the bus 115 for storing data and/or instructions for execution by the processor 111. In some embodiments, the memory 113 is used for storing temporary variables or other intermediate information during execution of instructions to be executed by the processor 111. In some embodiments, the memory 113 also includes a read-only memory or other static storage device coupled to the bus 115 for storing static information and instructions for the processor 111. In some embodiments, the memory 113 is an electronic, magnetic, optical, electromagnetic, infrared, and/or a semiconductor system (or apparatus or device). For example, the memory 113 includes a semiconductor or solid-state memory, a magnetic tape, a removable computer diskette, a random access memory (RAM), a read-only memory (ROM), a rigid magnetic disk, and/or an optical disk. In some embodiments using optical disks, the memory 113 includes a compact disk-read only memory (CD-ROM), a compact disk-read/write (CD-R/W), and/or a digital video disc (DVD).

The memory 113 is encoded with, i.e., storing, the computer program code, i.e., a set of executable instructions 117, for controlling one or more components of the CMP system and causing the control system 110 to perform the CMP processes. In some embodiments, the memory 113 also stores information needed for performing the CMP processes as well as information generated during performing the CMP process.

The network interface 114 includes a mechanism for connecting to a network 116, to which one or more other computer systems are connected. In some embodiments, the network interface 114 includes a wired and/or wireless connection mechanism. The network interface 114 includes wireless network interfaces such as BLUETOOTH, WIFI, WIMAX, GPRS, or WCDMA; or wired network interface such as ETHERNET, USB, or IEEE-1394. In some embodiments, the control system 110 is coupled with one or more components of the CMP system via the network interface 114. In some embodiments, the control system 110 is directly coupled with one or more components of the CMP system, e.g., with the components coupled to the bus 115 instead of via the network interface 114.

Embodiments of the present disclosure include a CMP system including a polishing pad having a window of a transparent layer with a hydrophilic surfactant applied to at least a portion of the surface of the transparent layer.

Further embodiments of the present disclosure include a CMP system including a platen that has a window made up of a transparent layer with a hydrophilic surfactant applied to at least a portion of the surface of the transparent layer.

Additional embodiments of the present disclosure include a method including forming a window by applying a hydrophilic surfactant to a surface of a transparent material, and the window in an opening in a platen or a polishing pad.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A chemical-mechanical planarization (CMP) system, comprising:
   a polishing pad having a polishing surface and comprising a first window disposed in the polishing pad, the first window comprising:
      a first transparent structural layer having
         a first surface and a second surface opposite the first surface; and
         a first permanent hydrophilic surfactant layer on at least a portion of each of the first surface and the second surface of the first transparent structural layer; and
   a platen supporting the polishing pad, the platen comprising a second window disposed in the platen and arranged beneath the first window, the second window comprising:
      a second transparent structural layer having a third surface and a fourth surface opposite the fourth surface; and
      a second permanent hydrophilic surfactant layer solely on an outer edge portion of the third surface of the second transparent structural layer proximal to the platen,
   wherein each of the first transparent structural layer and the second transparent structural layer comprises a hydrophobic polymer, and
   wherein each of the first permanent hydrophilic surfactant layer and the second permanent hydrophilic surfactant layer comprises an organic hydroxy compound, a hydrophilic polymer having a polyethylene chain with a functional group selected from —COOH, —OH, or a combination thereof or a hydrophilic polymer having a polyoxyethylene chain, and has a thickness ranging from 20 μm to 50 μm.

2. The CMP system of claim 1, wherein the first window further comprises a third permanent hydrophilic surfactant layer on the second surface of the first transparent structural layer.

3. The CMP system of claim 1, wherein each of the first transparent structural layer and the second transparent structural layer comprises a polyurethane.

4. The CMP system of claim 1, wherein the second surface of the first transparent structural layer is substantially coplanar with the polishing surface of the polishing pad.

5. A chemical-mechanical planarization (CMP) system, comprising:
   a platen comprising a window embedded in the platen and arranged over an endpoint detector, the window comprising:
   a transparent structural layer having a first surface and a second surface opposite the first surface; and
   a first permanent hydrophilic surfactant layer solely on an outer edge portion of the first surface of the transparent structural layer proximal to the platen and around a portion where the endpoint detector is located,
   wherein the transparent structural layer comprises a hydrophobic polymer and the first permanent hydrophilic surfactant layer comprises a hydrophilic polymer having a polyethylene chain with a functional group selected from —COOH, —OH, or a combination thereof; and
   a polishing pad on the platen.

6. The CMP system of claim 5, wherein the window further comprises a second permanent hydrophilic surfactant layer on the second surface of the transparent structural layer.

7. The CMP system of claim 5, wherein the transparent structural layer is a polyurethane.

8. The CMP system of claim 5, wherein the second surface of the transparent structural layer is closest to the endpoint detector.

9. The CMP system of claim 5, wherein the first surface of the transparent structural layer is substantially coplanar with a surface of the platen.

10. The CMP system of claim 5, wherein the first surface of the transparent structural layer is recessed below a surface of the platen.

11. The CMP system of claim 5, wherein the polishing pad comprises a pad window embedded in the polishing pad and arranged over the window of the platen.

12. The CMP system of claim 11, wherein the pad window has a lateral dimension greater than a lateral dimension of the window of the platen.

13. The CMP system of claim 11, wherein the pad window comprises:
   an another transparent structural layer having a third surface and a fourth surface opposite the third surface; and
   a third permanent hydrophilic surfactant layer solely an outer edge portion of the third surface of the another transparent structural layer proximal to the polishing pad and around the portion where the endpoint detector is located,
   wherein the another transparent structural layer also comprises the hydrophobic polymer and the third permanent hydrophilic surfactant layer comprises the hydrophilic polymer having the polyethylene chain with the functional group selected from —COOH, —OH, or a combination thereof.

14. The CMP system of claim 13, wherein the pad window further comprises a second permanent hydrophilic surfactant layer on at least a portion of the second surface of the transparent structural layer.

15. The CMP system of claim 5, wherein the first permanent hydrophilic surfactant layer has a thickness ranging from 20 μm to 50 μm.

16. A method, comprising:
   applying a hydrophilic surfactant to a first surface of a transparent structural layer to form a window comprising the transparent structural layer and a first permanent layer of the hydrophilic surfactant on the first surface of the transparent structural layer, the first permanent layer of the hydrophilic surfactant having a thickness ranging from 20 μm to 50 μm, wherein the transparent structural layer comprises a hydrophobic polymer and the hydrophilic surfactant comprises a hydrophilic polymer having a polyethylene chain with a —COOH functional group, a hydroxyl functional group, or a combination thereof or a hydrophilic polymer having a polyoxyethylene chain; and
   mounting the window in an opening in each of a platen and a polishing pad of a chemical-mechanical planarization (CMP) system;
   wherein a platen window in the platen comprises:
   the transparent structural layer having the first surface and a second surface opposite the first surface; and
   the first permanent hydrophilic surfactant layer solely an outer edge portion of the first surface of the transparent structural layer proximal to the platen.

17. The method of claim 16, wherein applying the hydrophilic surfactant comprises brushing the hydrophilic surfactant on the first surface of the transparent structural layer.

18. The method of claim 16, wherein applying the hydrophilic surfactant comprises spraying the hydrophilic surfactant on the first surface of the transparent structural layer.

19. The method of claim 16, further comprising applying the hydrophilic surfactant to a second surface of the transparent structural layer to form a second permanent layer of the hydrophilic surfactant on the second surface of the transparent structural layer, the second surface being opposite the first surface of the transparent structural layer.

20. The method of claim 16, further comprising forming the opening.

* * * * *